United States Patent [19]
Perez

[11] 3,977,050
[45] Aug. 31, 1976

[54] FASTENER ASSEMBLY

[75] Inventor: Abel Macias Perez, Mexico City, Mexico

[73] Assignee: Monarch Marking Systems, Inc., Dayton, Ohio

[22] Filed: Jan. 20, 1975

[21] Appl. No.: 542,140

[30] Foreign Application Priority Data
Apr. 19, 1974 Mexico ................................ 150718

[52] U.S. Cl. ............................................ 24/150 FP
[51] Int. Cl.² ............................................ A44B 9/00
[58] Field of Search ........ 24/150 FP, 16 PB, 67 PR, 24/153 R

[56] References Cited
UNITED STATES PATENTS

| | | |
|---|---|---|
| 3,009,220 | 11/1961 | Fein .................................. 24/16 PB |
| 3,103,666 | 9/1963 | Bone ........................ 24/150 FP UX |
| 3,273,705 | 9/1966 | Rieger et al. ............. 24/150 FP UX |
| 3,354,023 | 11/1967 | Dunnington et al. ......... 24/16 PB X |
| 3,444,597 | 5/1969 | Bone .............................. 24/150 FP |
| 3,875,648 | 4/1975 | Bone ........................... 24/150 FP X |

*Primary Examiner*—Donald A. Griffin
*Attorney, Agent, or Firm*—Joseph J. Grass

[57] ABSTRACT

There is disclosed a fastener assembly having a plurality of fasteners each having a crossbar, a head, and a filament joining the crossbar and the head, a rod spaced from the crossbars, and a separate connector connecting each crossbar and the rod. The fasteners assembly is composed of an injection moldable plastic material comprised of a moldable nylon polymer containing a minor amount of a film or fiber forming polyester polymer.

12 Claims, 6 Drawing Figures

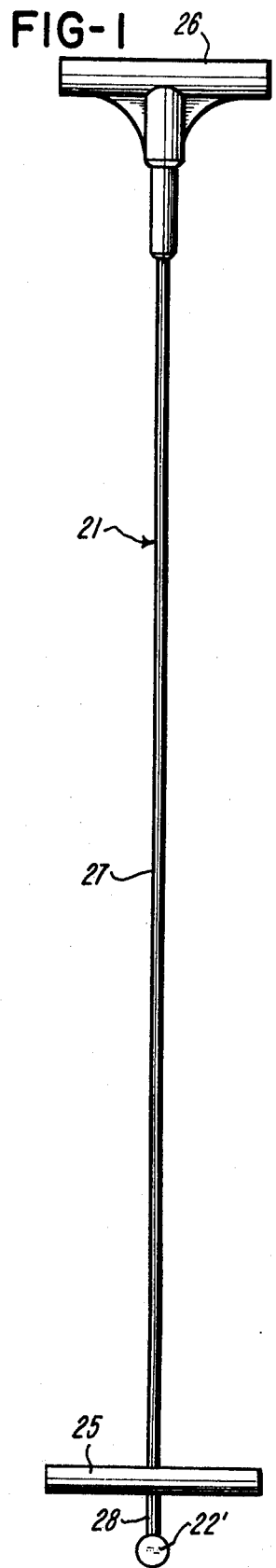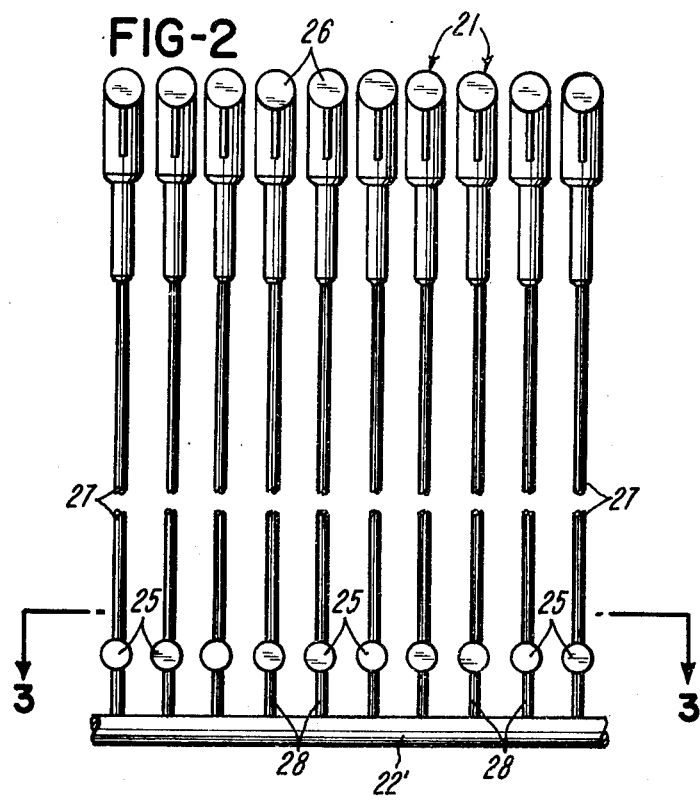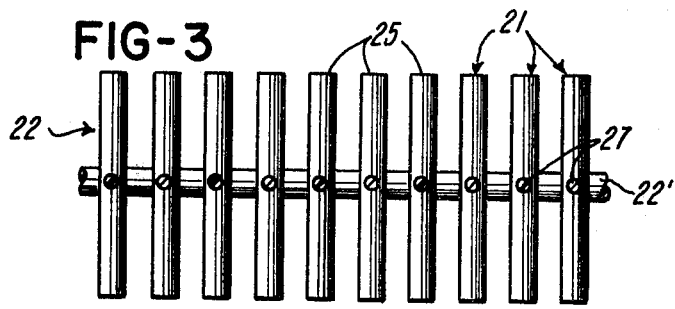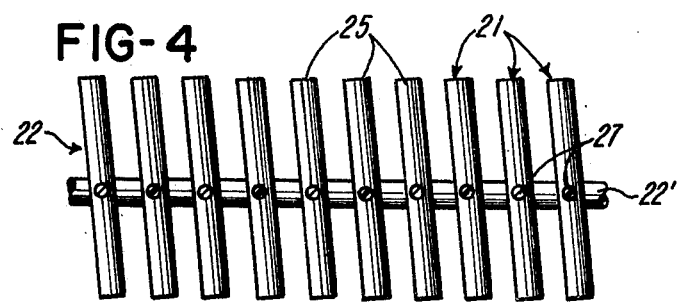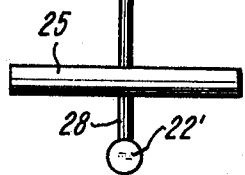

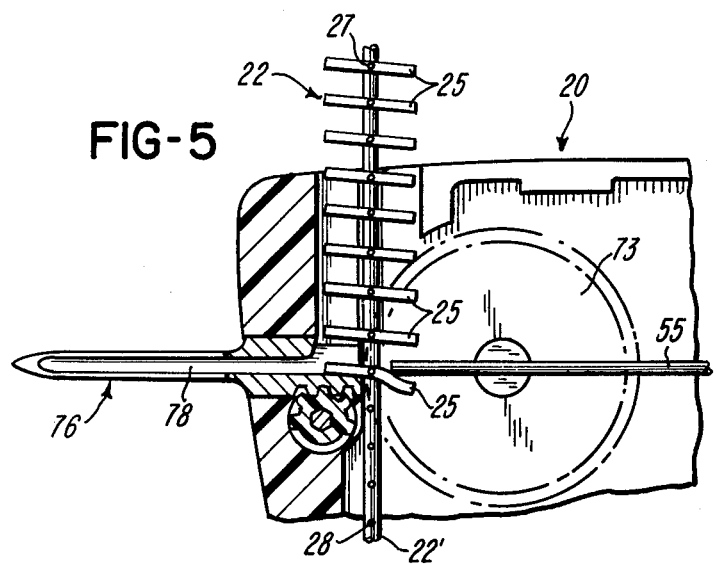
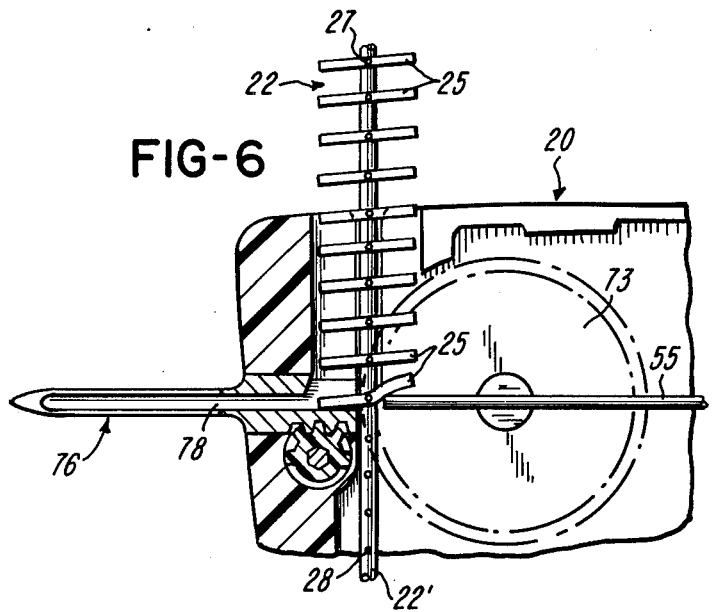

FASTENER ASSEMBLY

BACKGROUND OF THE INVENTION

1. Field of the Invention

This invention relates to the art of fastener assemblies.

2. Brief Description of the Prior Art

One prior art fastener assembly of the type to which the invention relates, a fastener assembly mold, and a tag attaching apparatus are disclosed in U.S. Pat. No. 3,103,666. The fasteners of that patent are stated to be preferably made of a plastically flexible material such as nylon. U.S. Pat. No. 3,444,597 discloses the best materials to be nylon, polypropylene, a polyethylene. It is relatively easy to sever a crossbar from its respective connector when the fastener assembly is composed of nylon, e.g., nylon-6. It has been found that in a fastener assembly composed of polypropylene, there exists the distinct disadvantage that it takes considerably more force to sever a crossbar from its respective connector than in the case of a nylon fastener assembly. Another tag attaching apparatus is disclosed in U.S. Pat. No. 3,650,452.

Even in the prior art fastener assemblies, in the as-molded condition, the crossbars are parallel to each other and perpendicular to the rod. The molded fastener assemblies are normally removed from the mold and stretched, although it has been proposed in U.S. Pat. No. 3,380,122 to stretch the fastener assembly while still in the mold. Unless care is taken in the handling and packaging of the freshly molded fastener assemblies, some or all of the crossbars can be deflected so as to be out of parallel with each other, and hence they are no longer perpendicular to the rod. If the deflected crossbars are allowed to remain in such a disoriented position they will take a relatively permanent set. Assuming that this permanent set condition exists in a fastener assembly, jamming problems can result when such a fastener assembly is used in a tag attaching apparatus. More specifically, when the crossbars, or some of them, are not perpendicular to the rod, the crossbars tend to misalign with the bore of the needle of the apparatus. When it is attempted to push the misaligned crossbar through the needle bore, the leading end of the misaligned crossbar can come into abutment with the end of the needle or other structure of the apparatus, causing jamming. The invention is directed to constructing the fastener assembly of a flexible material which tends to prevent the crossbars from becoming readily misaligned during handling and packaging and yet which does not exhibit the above-mentioned disadvantage characteristic of polypropylene fastener assemblies of this type.

SUMMARY OF THE INVENTION

This invention is directed to constructing a fastener assembly of the type having a fastener, with each fastener having a crossbar, a head, and a filament joining the crossbar and the head, a rod spaced from the crossbars, and a separate connector connecting each crossbar and the rod. The improvement resides in constructing the fastener assembly of an injection moldable polymer comprised essentially of moldable nylon polymer containing a minor amount of a film or fiber forming polyester polymer. It has been found that when using a composition of nylon of which five percent by weight is polyester, the crossbars do not tend to become misaligned with respect to the rod during handling and packaging as when nylon alone is used in the molding of the fastener assembly. When the polyester comprises ten percent by weight of the molding material, substantially the same results are obtained, although the strength of the filament is less than when only five percent polyester is used in the molding process. Even greater percentages of polyester can be used but with concomitant reduction in the strength of the filament.

Typically, between about 1% to about 25% by weight of the total moldable polymer composition comprises polyester. More preferably, between about 2% and about 10% by weight of polyester is employed. Most preferably, about 5% by weight of the total composition comprises polyester.

The moldable nylon polymers employed in the compositions useful in the present invention are polyamides which are long chain polyamides which have recurring amide groups as an integral part of the main polymer chain, and which recurring intralinear carbonamide groups in the polyamides are separated by at least two carbon atoms, and which polyamides are capable of being formed into a film or fiber in which the structural elements are oriented in the axial direction. The polyamides useful in the present invention may be made by any of the well known processes. For example, polyamides can be made by the polymerization of amino acids such as omega-amino undecanoic acid, by the polycondensation of lactams, such as caprolactam, or by the condensation of various dicarboxylic acids, such as adipic acid and sebacic acid, with diamines, such as hexamethylene and octamethylene diamines.

Representative polyamides which may be used herein and their method of production are set forth in U.S. Pat. Nos. 2,071,250; 2,071,251; 2,071,252; 2,071,253 and 2,130,948, the "Collected Papers of Wallace Hume Carothers on High Polymeric Substances", Interscience Publishers, Inc., New York, 1940, as well as pages 219–227 of "Modern Plastics Encyclopedia", 1962 and the references listed therein.

Polyamides are typically designated by a numbering system wherein the first number indicates the amine utilized in its formation, and the second number indicates the acid employed. Where only one number is present, it indicates the lactam or amino acid which is condensed to form the polyamides. Typical polyamides include nylon-6 (e.g., polycaprolactam), nylon-6/6 (e.g., hexamethylenediamineadipic acid or anhydride polycondensate), nylon-6/10 (e.g., hexamethylenediamine-sebacic acid or anhydride polycondensate), nylon-8/6 (e.g., N-alkoxymethylhexamethylenediamine-adipic acid or anhydride polycondensate), nylon-11 (e.g., 11-aminoundecanoic acid polycondensate) and the like.

The presently preferred nylons are nylon-6 and nylon-6/6. Nylon-6 is especially preferred.

An example of a nylon which can be employed is a nylon-6 having a reduced viscosity of about 1.04, a $T_g$ of about 35°C. and a density of 1.14g/cc at 23°C., the amine groups in the nylon-6 being blacked by reaction with sebacic acid, bringing the amine groups analysis thereof to 11 milliequivalents of $NH_2$ groups per kilogram of polymer. The nylon-6 contains, as a heat stabilizer 50 ppm copper or copper acetate. Other nylons include nylon-6/6 having a melt viscosity of 800 poises at 285°C. and nylon-6's having melt viscosities of 850 poises at 265°C and 1,500 poises at 260°C., respectively. Especially useful is a moldable nylon-6's having relative viscosities determined on a one percent solution in m-cresol at 25°C. of 3.1, 3.07, 3.47 and 3.58, respectively.

The polyester polymer which may be employed in the compositions useful in this invention are linear film or fiber forming polyesters. These polyesters include condensation polymers of dihydric alcohol with organodibasic acids and anhydrides thereof, particularly dicarboxylic acids and self condensation polymers of omegahydroxy carboxylic acids. It should be understood that the invention is applicable to all film and fiber forming polyesters in which the ester linkages are intralinear, including poly(alkylene alkanedioates), poly(cycloalkylenedimethylene alkanedioates), poly(alkylene arenedioates) and analogous materials. Examples of some of the abovenamed types of polyesters are poly(ethylene adipate), poly (1,4cyclohexylenedimethylene adipate), poly(ethylene terephthalate), poly(ethylene isophthalate), poly(coethylene terephthalate isophthalate) and poly(1,4cyclohexylenedimethylene terephthalate).

A presently preferred polyester is polyethylene terephthalate. Polyethylene terephthalate is a well known fiber and film forming saturated polyester of great commercial importance. It is usually made by:

i. esterification (methylation) of terephthalic acid, ii. ester interchange between the resultant dimethylterephthalate and excess glycol, yielding a mixture of bis(beta-hydroxyethyl) terephthalate and low molecular weight polymers having terminal beta-hydroxyethyl ester groups, and iii. heating the condensate under vacuum to effect removal of glycol in order to form a high molecular weight product.

In general, polyethylene terephthalate is amorphous as it comes from the reactor, and retains its amorphous form upon rapid cooling. Crystallization occurs upon reheating however, and the polymer then usually loses its transparent glossy appearance, turning opaque and white or pale cream in color. The crystalline polymer is a tough white opaque solid which has a normal equilibrium melting point of about 265°C. It is insoluble in most organic solvents.

One such polyethylene terephthalate (PET) polymer comprises chips having an inherent viscosity of 0.6 to 0.7 in an eight percent by weight and volume solution of orthochlorophenol at room temperature. Another PET is a granular polymer having an optical melting point of about 265°C., an amorphous density of 1.33 grams per cc at 23°C. and a reduced viscosity of about 0.85 and a $T_g$ of about 65°C.

A particularly useful polyester polymer is the polyester chip sold by Badische Anilin & Soda-Fabrik as Ultralen-P, granules of cubic shape having a relative viscosity determined in a mixture of phenol/orthodichlorobenzene 3:2 (concentration: $0.5_0$ in a solution of 100 mil) at 25.0°C. of 1.395±0.015, and ash content of 0.5±0.05% and a 0.5% maximum moisture content.

BRIEF DESCRIPTION OF THE DRAWINGS

FIG. 1 is an end elevational view of a fastener assembly to which the invention relates;

FIG. 2 is a partly broken away side elevational view of the fastener assembly;

FIG. 3 is a sectional view taken along line 3—3 of FIG. 2 showing the orientation of the crossbars as being parallel to each other and perpendicular to the rod;

FIG. 4 is a view similar to FIG. 3, but showing how the crossbars are inclined relative to the rod rather than being perpendicular relative to the rod;

FIG. 5 is a view showing a fragmentary view of a commercially available tag attaching apparatus according to U.S. Pat. No. 3,650,452, with the crossbars of the fastener assembly being inclined in one direction; and FIG. 6 is a view similar to FIG. 4, but showing the crossbars inclined in the opposite direction.

DESCRIPTION OF THE PREFERRED EMBODIMENT

The invention is shown in FIGS. 1, 2 and 3, whereas FIGS. 3, 5 and 6 illustrate a problem fastener assembly not constructed in accordance with the principles of the invention; although for the sake of simplicity the same reference characters are used throughout the drawings and the following description, and correspond to those used in U.S. Pat. No. 3,650,452.

Apparatus 20 uses fasteners 21 which are interconnected to provide a fastener assembly 22. Each fastener 21 includes a crossbar or bar section 25 and a button or head 26 joined by a string section or filament 27. The fastener assembly 22 also includes a rod or holder 22' and separate connectors 28 which connect the respective crossbars 25 and the rod 22'.

A feed wheel 73 is used to advance the fastener assembly 22. A push or drive rod 55 is designed to contact the rear end of the crossbar 25 which is aligned with the needle bore 78 and to push the crossbar 25 through the bore 78. When the crossbar or crossbars 25 are not perpendicular to the rod 22', as shown in FIGS. 4, 5 and 6, the crossbars 25 will not align with the bore 78 and the push rod 55 will either push the crossbar 25 into the end of the needle 76 or nearby structure of the apparatus or the push rod 55 will slip past the rear end of the crossbar 25 and cause further deflection of the crossbar 25 and jamming of the apparatus 20.

By way of example, not limitation, when a moldable nylon-6 polymer, such as is conventionally employed in this art, was blended, in chip form with Ultralen-P polyester spinning chips, described above, to form a mixture containing 95% nylon-6 and 5% polyester and placed in an injection molding machine with a suitable mold, as employed in the art, and molded in the conventional manner there were formed fastener assemblies 22 which performed substantially better, with less jamming in an apparatus 20, then identical fastener assemblies molded from the same nylon-6 per se.

It is thus apparent that the invention is conducive to eliminating jamming of the tag attaching apparatus.

Other embodiments and modifications of this invention will suggest themselves to those skilled in the art, for example, other nylons and other polyesters, other than those specifically exemplified, may be substituted for those specifically shown, while achieving similar results; likewise the portions of the material employed may be varied, and all such of these as come within the spirit of this invention are included within its scope as best defined by the appended claims.

What is claimed is:

1. A one-piece injection molded fastener assembly adapted to be dispensed by a tag attacher, comprising; a plurality of fasteners each having a crossbar, a head, and a filament joining the crossbar and the head, a rod spaced from the crossbars, and a separate connector connecting each crossbar and the rod, the crossbars being molded parallel with respect to each other and perpendicular with respect to the rod, wherein the fastener assembly is composed of injection-moldable polymer composition comprised of a moldable nylon containing a minor amount, between about 1% to about 25% by weight of the moldable polymer composition, of a polyester selected from the group consisting of film and fiber forming polyesters the amount of polyester being an amount which increases the tendency of the crossbars to remain parallel to each other and perpendicular to the rod after removal of the fastener assembly from the mold.

2. A fastener assembly, as defined in claim 1, wherein the nylon is selected from the group consisting of nylon-6 and nylon-6/6.

3. A fastener assembly, as defined in claim 2, wherein the nylon is nylon-6.

4. A fastener assembly, as defined in claim 1, wherein the polyester is a polyethylene terephthalate.

5. A fastener assembly, as defined in claim 4, wherein the nylon is selected from the group consisting of nylon-6 and nylon-6/6.

6. A fastener assembly, as defined in claim 5, wherein the nylon is nylon-6.

7. A fastener assembly, as defined in claim 1, wherein the amount of polyester is an amount between about 2% and about 10% by weight of the moldable polymer composition.

8. A fastener assembly, as defined in claim 7, wherein the nylon is selected from the group consisting of nylon-6 and nylon-6/6.

9. A fastener assembly, as defined in claim 8, wherein the nylon is nylon-6.

10. A fastener assembly, as defined in claim 7, wherein the polyester is a polyethylene terephthalate.

11. A fastener assembly, as defined in claim 10, wherein the nylon is selected from the group consisting of nylon-6 and nylon-6/6.

12. A fastener assembly, as defined in claim 11, wherein the nylon is nylon-6.

* * * * *